United States Patent
D'Arrigo et al.

(10) Patent No.: US 7,498,771 B2
(45) Date of Patent: Mar. 3, 2009

(54) BATTERY CHARGING DEVICE WITH VOLTAGE-BALANCED TRANSISTORS

(75) Inventors: Angelo D'Arrigo, Catania (IT); Filippo Marino, Tremestieri Etneo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 11/741,456

(22) Filed: Apr. 27, 2007

(65) Prior Publication Data

US 2007/0257639 A1    Nov. 8, 2007

Related U.S. Application Data

(63) Continuation of application No. PCT/EP2005/055338, filed on Oct. 18, 2005.

(51) Int. Cl.
*H01M 10/46* (2006.01)

(52) U.S. Cl. .................................................. 320/128

(58) Field of Classification Search ............. 320/107, 320/128, 137, 150
See application file for complete search history.

(56) References Cited

U.S. PATENT DOCUMENTS

| | | | | | |
|---|---|---|---|---|---|
| 5,422,559 | A | * | 6/1995 | Hall et al. | 320/139 |
| 5,977,755 | A | * | 11/1999 | Miki et al. | 323/269 |
| 6,437,549 | B1 | | 8/2002 | Takagishi | |

FOREIGN PATENT DOCUMENTS

EP          1052758 A1      11/2000

\* cited by examiner

*Primary Examiner*—Edward Tso
(74) *Attorney, Agent, or Firm*—Lisa K. Jorgensen; Andy M. Han; Seed IP Law Group PLLC (57) ABSTRACT

A device suitable for charging a battery includes at least a first and a second transistor. The transistors are connected to an input voltage and have output terminals; the output terminal of the first transistor is connected to the battery. The device comprises a circuit for driving the transistors and the drive circuit comprises a regulator suitable for regulating the current in the battery during the charging phase of the battery. The regulator is suitable for keeping the voltage on the output terminals of the transistors the same during the charging phase of the battery.

30 Claims, 4 Drawing Sheets

BATTERY CHARGING DEVICE WITH VOLTAGE-BALANCED TRANSISTORS

BACKGROUND

1. Technical Field

The present invention refers to a battery-charging device.

2. Description of the Related Art

Battery chargers are generally known in the state of the technique, for example cellular telephone batteries, as batteries of the lithium ion type.

The charging of these batteries comes about according to a known constant current (CC) and constant voltage (CV) procedure. During the battery charging phase the charger works according to a current regulation procedure, that is a constant current is supplied to the battery. In the meantime the voltage on the battery grows until it reaches its steady state charge value; in proximity of this value, the charge current starts diminishing until it nullifies itself and the charger enters the voltage regulation phase, that is the battery is supplied with a constant voltage.

Generally in this procedure high precision of the regulated current as well as the regulated voltage are important. The values generally are 10% for the charge current and 1% for the regulated voltage. In addition, one should make sure that the temperature of the device does not exceed the thermal limits also depending on the charger device used.

Figure 1:
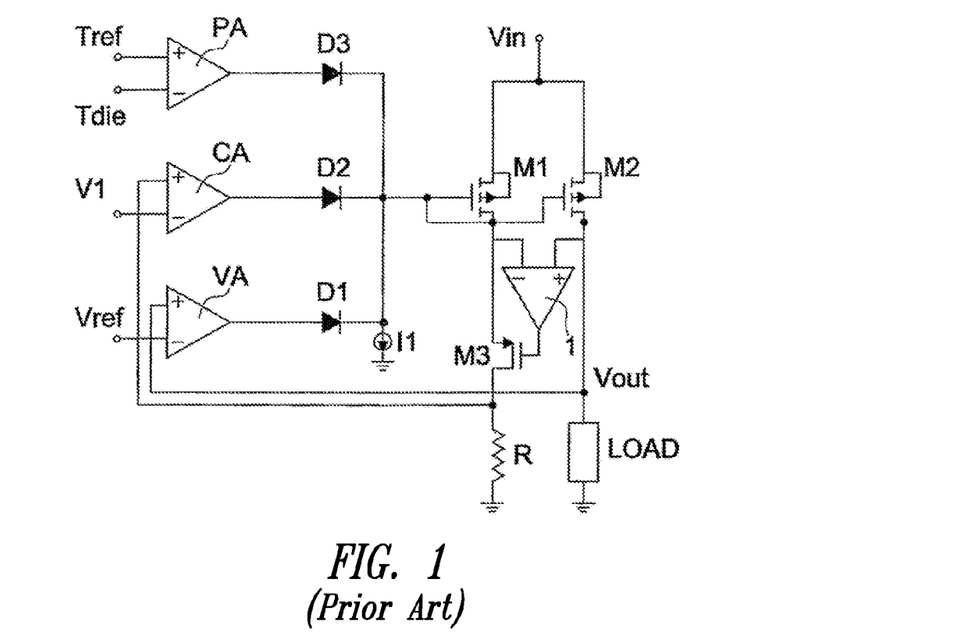
FIG. 1 shows a battery charger in accordance with the known art.

Among the various types of battery charger devices one that is generally used is shown in FIG. 1.

The device comprises means CA, D2 suitable for regulating the current of a battery LOAD, means VA, D1 suitable for regulating the voltage and means PA, D3 suitable for regulating the power.

The device comprises a couple of PMOS transistors M1 and M2 having the source terminal connected to an input voltage Vin; the drain terminal of the transistor M2 is connected to the battery LOAD having its other terminal connected to ground and the drain terminal of the transistor M1 is connected to the source terminal of a transistor M3. The latter has the drain terminal connected to a resistor R having its other terminal connected to ground. The gate terminal of the transistor M3 is driven by an operational amplifier 1 having the inverting and non-inverting input terminals connected respectively to the drain terminals of the transistors M1 and M2.

A current generator 11 and the cathodes of the diodes D1-D3, having the anodes connected to the respective operational error amplifiers VA, CA and PA, are connected to the gate terminals of the transistors M1 and M2. The amplifier VA has in input on the inverting terminal a reference voltage Vref and on the non-inverting terminal the voltage Vout at the terminals of the battery LOAD, the amplifier CA has in input on the inverting terminal a reference voltage V1 and on the non-inverting terminal the voltage Vout and the amplifier PA has in input on the inverting terminal the temperature of the charger device Tdie and on the non-inverting terminal a reference temperature Tref.

During the charging phase of the battery LOAD there is the current regulation phase; the control of the PMOS transistors M1 and M2 is carried out by the error amplifier CA because the error amplifier VA is unbalanced, the voltage Vout being less than the voltage Vref. When the voltage Vout reaches the voltage Vref, the control of the transistors M1 and M2 passes to the amplifier VA that supplies all the current needed to directly bias the diode D1 while the diode D2 is cut off.

If the temperature of the charger device is higher than the reference temperature Tref, the control passes to the amplifier PA that directly biases the diode D3.

So that the regulated current on the charge is very precise the voltages between drain and source of the MOS transistors M1 and M2 have to be equal to each other. As both the MOS transistors have the same voltage between the gate and source terminals, the charge current is equal to that of reference $$\frac{V1}{R}$$

multiplied by the ratio of the areas of the MOS transistors M1, M2. For this reason the amplifier 1 is introduced to maintain the drain terminals of the transistors M1 and M2 at the same potential.

BRIEF SUMMARY

One embodiment of the present invention is a battery-charging device that has a simpler circuitry than that of known chargers and that in addition has greater precision.

One embodiment of the present invention is a device suitable for charging a battery comprising at least a first and a second transistor, said transistors being connected to an input voltage and having output terminals, the output terminal of said first transistor being connected to said battery. The device includes a drive circuit of said transistors, said drive circuit comprising a regulator suitable for regulating the current in said battery during the charging phase of said battery, the regulator being suitable for keeping the voltage on the output terminals of said transistors the same during the charging phase of said battery.

The battery charging device can be produced which has a lower number of components and a lower occupation of area in the chip where the device is integrated. With said device we also have high precision in the phases of regulating the current and the voltage in the battery.

BRIEF DESCRIPTION OF THE SEVERAL VIEWS OF THE DRAWINGS

The characteristics and the advantages of the present invention will appear evident from the following detailed description of an embodiment thereof, illustrated as non-limiting example in the enclosed drawings, in which.

DETAILED DESCRIPTION

Figure 2:
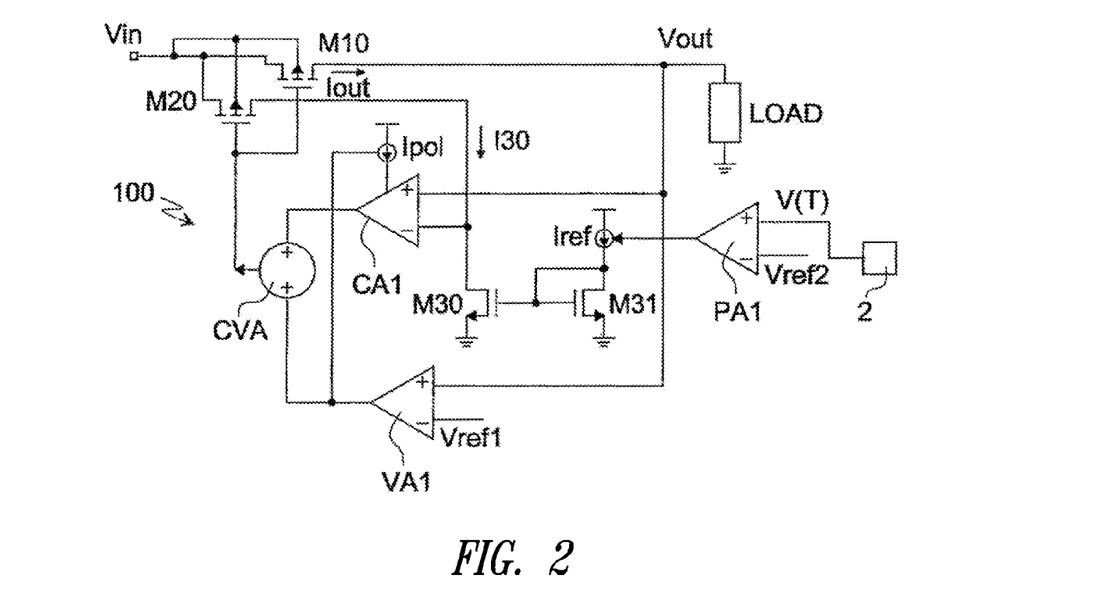
FIG. 2 shows a diagram of a battery charger according to one embodiment the present invention.

With reference to FIG. 2 a diagram of a battery-charging device according to one embodiment of the present invention is shown. The device comprises a couple of PMOS transistors M10 and M20 having the source terminal connected to an input voltage Vin. The drain terminal of the transistor M10 is connected to the battery LOAD having its other terminal connected to ground. The charging device comprises a circuit 100 suitable for driving the gate terminals of the transistors M10 and M20. The drain terminal of the transistor M20 is also connected to circuit 100; more precisely said terminal is connected to the drain terminal of a transistor M30 being part of a current mirror M30-M31. Said current mirror is suitable for mirroring on the transistor M10 the current 130 proportional to the current Iref coming from a homonymous current generator. The latter is controlled by an operational amplifier PA1 having in input on the inverting terminal the reference voltage Vref2 and on the non-inverting terminal a voltage V(T) proportional to the temperature of the device; the voltage V(T) is produced by a device 2 that is sensitive to the temperature. When the temperature of the device increases and the voltage V(T) becomes the same as the voltage Vref2, the amplifier PA1 acts commanding a decrease of the current Iref. Consequently the current 130 and the charge current that flows in the transistor M10 are also decreased. Consequently the power dissipated in the transistor M10 decreases and this also makes the temperature of the device decrease; the intervention of the amplifier PA1 occurs until the balance between the temperature of the device and the current in transistor M10 that produces this temperature is reached.

The drain terminals of the transistors M10 and M20 are connected to the non-inverting and inverting input terminals of an operational error amplifier CA1 belonging to the drive circuit 100. The output of the amplifier CA1 converges with the output of an operational error amplifier VA1 on a circuit block CVA whose output signal is suitable for driving the transistors M10 and M20. The amplifier VA1 has in input on the inverting terminal a reference voltage Vref1 and on the non-inverting terminal the voltage Vout at the terminals of the battery LOAD. The non-inverting input of the amplifier CA1 is connected to the terminal being regulated, that is the drain terminal of the transistor M10: in this manner the loop constituted by the amplifier CA1, by the circuit block CVA and by the transistors M10 and M20 being in equilibrium, maintains the voltages on the drain terminals of the transistors M10 and M20 at the same value for the whole time in which the voltage Vout grows towards its steady state value Vref, without the need to provide a further amplification stage. The regulated current is thus exactly the same as the reference current Iref multiplied by the ratio of the areas of the MOS transistors M10 and M20. The circuit block CVA is equivalent to an adder node whose output signal coincides with the output signal from the amplifier CA1 or with the output signal from the amplifier VA1 when one or the other are active. The amplifier CA1 has a bias current Ipol controlled by the output signal of the amplifier VA1. During the current regulation, the voltage Vout increases until it reaches the reference value Vref1. When this comes about, the system gradually reduces the bias current Ipol of the stage CA1 to zero so that the active regulation loop becomes that of voltage, constituted by the amplifier VA1, by the block CVA and by the MOS transistors M10 and M20.

Figure 3:
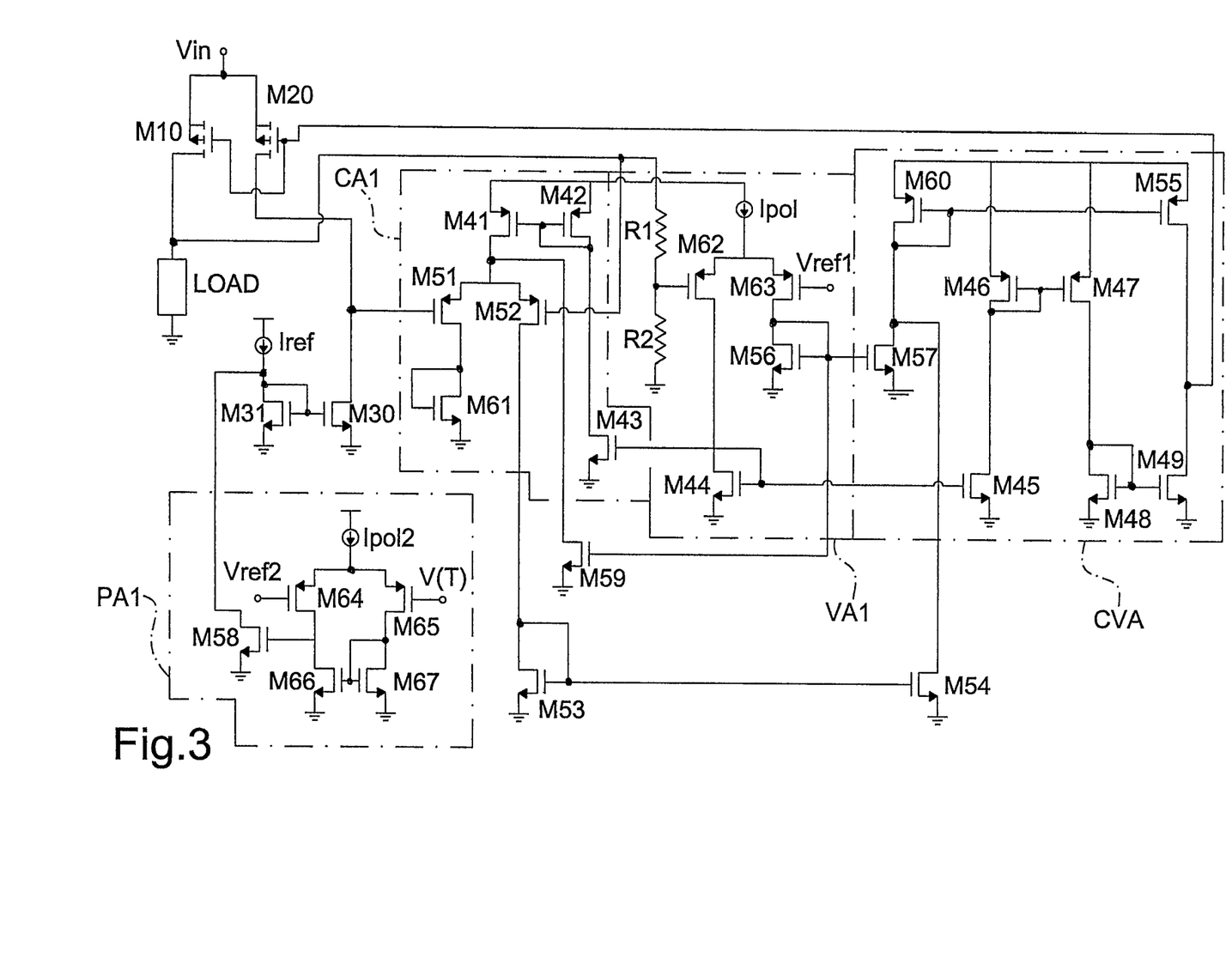
FIG. 3 shows a circuit implementation of the battery charger of FIG. 2.

A circuit implementation of the device of FIG. 2 is shown in FIG. 3. When the battery LOAD is discharged, the voltage Vout is less than the reference voltage Vref, the amplifier VA1 is unbalanced and the error amplifier CA1 is biased by the current Ipol by means of the mirrors formed by the PMOS transistors M41-M42 and by the NMOS transistors M43-M44. This current is also mirrored in the NMOS transistor M49, at the output of the stage CVA, by means of NMOS transistor mirrors M44-M45, PMOS transistor mirrors M46-M47 and NMOS transistor mirrors M48-M49.

The differential stage of the amplifier CA1, constituted by the PMOS transistors M51-M52 whose gate terminals are connected to the drain terminals of the transistors M20 and M10, sees to regulating the charge current in the battery LOAD by means of transistor mirror M53-M54 which, sending the signal to the output stage CVA, generates in the transistor M55, by means of the current mirror M60-M55, a current that balances the current of the transistor M49; in this manner the equilibrium of the currents is obtained. The drain terminal of the transistor M51 is connected to a transistor M61 in diode connection, connected in turn to ground.

The amplifier VA1 comprises a differential stage with PMOS transistor M62-M63; on the gate terminals of said transistors there are respectively a part of the voltage Vout given by $$\frac{Vout \times R2}{R1 + R2}$$

and the reference voltage Vref1. The source terminals of the transistors M62 and M63 are connected to a generator of the bias current Ipol and the drain terminals are connected respectively to the drain terminals of the transistors M44 and M56.

It should be noted that, in current regulation, the amplifier VA1 has no effect because of its unbalance that prevents the passage of current in the current mirror formed by the NMOS transistors M56-M57.

The amplifier PA1 comprises a differential stage with PMOS transistor M64 and M65 and a current mirror of NMOS transistor M66-M67. The source terminals of the transistors M64 and M65 are connected to a generator of the bias current Ipol2 and the drain terminals are connected respectively to the drain terminals of the transistors M66 and M67. The gate terminals of the transistors M64 and M65 are connected to a reference voltage Vref2 and to the voltage V(T) and the drain terminal of the transistor M64 is connected to the gate terminal of the transistor M58.

If the temperature of the system is such that the signal V(T)=K×T is less than Vref2, the amplifier PA1 is unbalanced and turns off the transistor M58. Thus the reference current Iref is entirely mirrored in the transistor M20 and, during the entire charging phase of the battery, the regulated current is exactly a multiple of the current Iref, as the amplifier CA1 sees to equalling the drain-source voltages of the transistors M10 and M20.

If the temperature of the system is such that V(T) reaches Vref2, the stage PA1 tends to subtract a part of the current Iref at the mirror M30-M31. Consequently the charge current is less than its nominal value and it will settle itself at a value that balances the temperature of the device Tj according to the formula:

$$Tj = Tamb + (Vin - Vout) \times Iout \times \theta$$

where Tamb is the temperature outside the system, Iout is the charge current and θ is the thermal resistor of the package of the device.

The temperature loop, being dynamically slow because of the reaction times of the package, has a dominating pole almost at the origin and has no need for compensation.

When the voltage Vout reaches the reference voltage Vref1, the amplifier VA1 balances itself and the NMOS mirror transistor M56-M59 tends to subtract the bias current Ipol of the amplifier CA1 which then turns off. In this manner the stage VA carries out the voltage regulation of the output.

The compensation of the regulation loop current/voltage has been carried out by means of a Miller capacitor connected between the gate and the drain terminals of the transistor M20.

Figure 4:
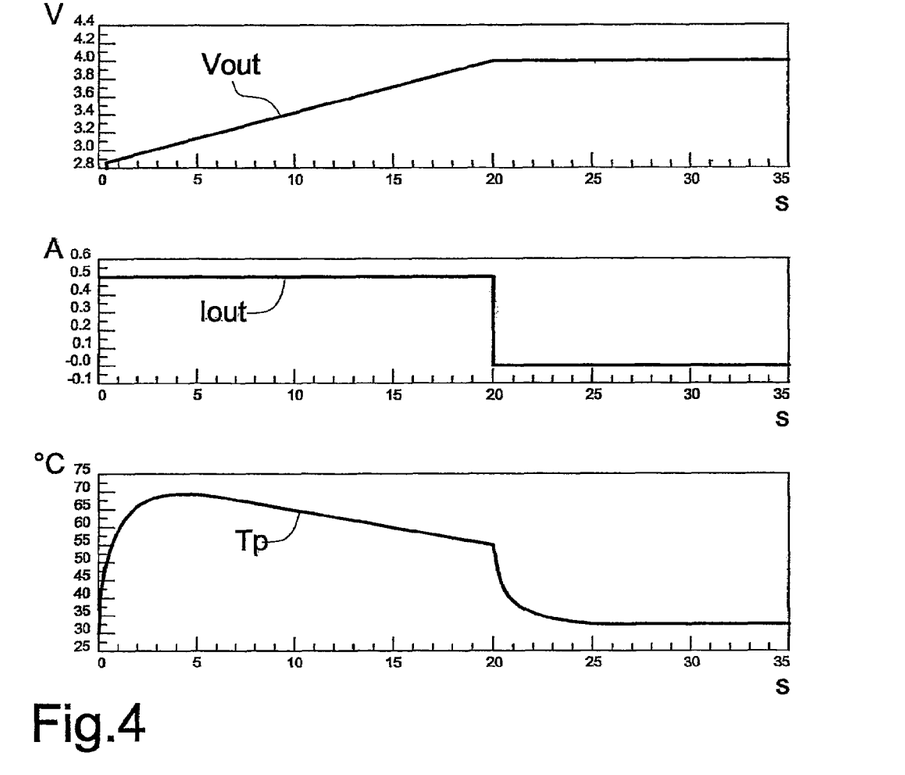
FIG. 4 shows the diagrams of the time trend of the voltage Vout, of the output current Iout and of the temperature Tp in the charging phase of the battery obtained with the device of FIG. 3 in the case that no regulation of the temperature is carried out.

FIG. 4 shows time graphs of the voltage Vout, of the output current Iout and of the temperature Tp in the charging phase of the battery, with an input voltage Vin=5V and an external temperature of 25° C. The charge current is programmed at 0.5 A. The maximum junction temperature set by specification is Tj=120° C. In this case it can be seen that the temperature of the system is lower and thus the charge current is equal to that programmed. In voltage regulation the charge current decreases until it annuls itself and the regulated voltage on the battery is 4.1V, as per specification.

Figure 5:
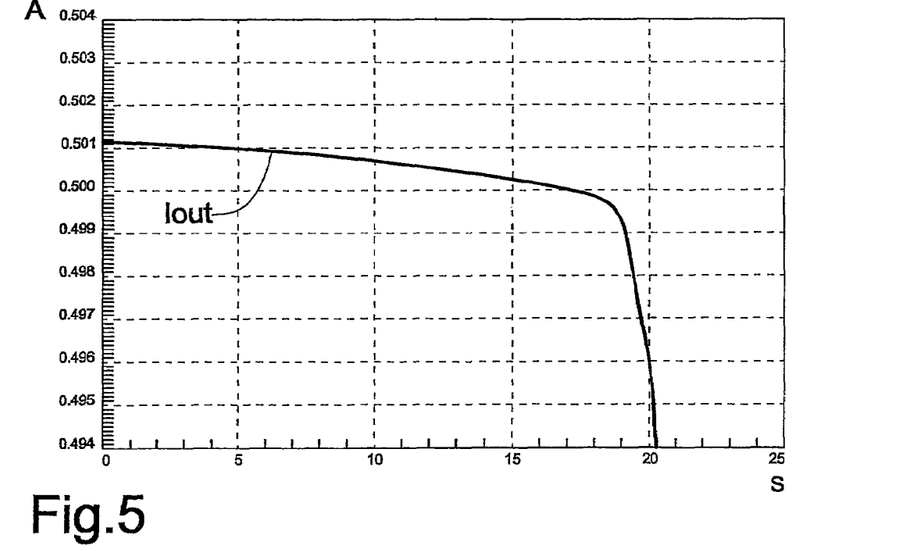
FIG. 5 is an enlargement of a part of the diagram of the time path of the current Iout of FIG. 4.

FIG. 5 shows an enlargement of the charge current of the battery Iout during the current regulation. The excellent precision, which is 0.2%, is highlighted.

Figure 6:
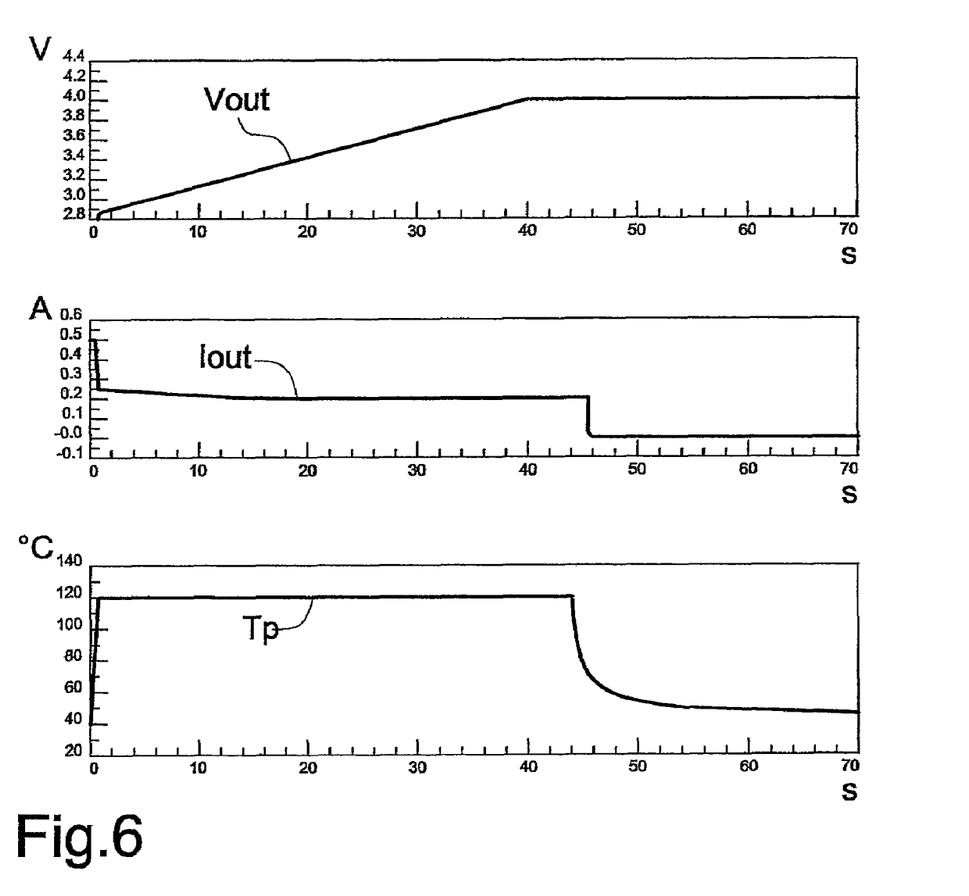
FIG. 6 shows the diagrams of the time trend of the voltage Vout, of the output current Iout and of the temperature Tp in the charging phase of the battery obtained with the device of FIG. 3 in the case that regulation of the temperature is carried out.

FIG. 6 shows time graphs of the voltage Vout, of the output current Iout and of the temperature Tp in the charging phase of the battery when Vin=12V at an external temperature of 25° C. As before, the current is programmed at 0.5 A. In this case the temperature of the device is regulated at 120° C., lowering the charge current to approximately 0.24 A.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device suitable for charging a battery, comprising:
   first and second transistors connected to an input voltage and having output terminals, the output terminal of said first transistor being structured to be connected to said battery; and
   a drive circuit structured to drive said transistors, said drive circuit comprising first means for regulating a current in said battery during a charging phase of said battery, said first means keeping respective voltages on the output terminals of said transistors equal to each other during the charging phase of said battery, wherein said first means comprise an operational amplifier having inverting and non-inverting input terminals respectively connected to the output terminals of said transistors, said operational amplifier being suitable for driving said transistors to provide a constant current to said battery.

2. The device according to claim 1 wherein said drive circuit comprises further means for regulating a voltage of said battery when the voltage of said battery has reached a reference voltage.

3. The device according to claim 2 wherein said further means turn off said first means when the voltage of the battery has reached said reference voltage.

4. The device according to claim 1 wherein said drive circuit comprises second means, connected to the output terminal of said second transistor, for setting a current that flows through said second transistor.

5. The device according to claim 4, wherein said second means comprise means for varying the current on said second transistor in function of the temperature of the device.

6. The device according to claim 5, wherein said second means comprise a current generator; means, sensitive to a temperature of the device, for producing a voltage in function of the temperature of the device; and means for comparing the voltage produced by said sensitive means with a reference voltage and varying the current on said second transistor in function of said comparison.

7. A device, comprising:
   a battery; and
   a charging device structured to charge the battery, the charging device including:
   first and second transistors connected to receive as input an input voltage and having output terminals, the output terminal of said first transistor being connected to said battery; and
   a drive circuit structured to drive said transistors, said drive circuit comprising first means for regulating a current in said battery during a charging phase of said battery, said first means keeping respective voltages on the output terminals of said transistors equal to each other during the charging phase of said battery, said drive circuit further comprising second means for varying the current on said second transistor in function of a temperature of the device.

8. The device according to claim 7, wherein the first and second transistors each has a respective input terminal, and wherein the input terminals of the first and second transistors are directly connected in common to each other.

9. The device according to claim 7, wherein the first and second transistors each has a respective control terminal, and wherein the control terminals of the first and second transistors are directly connected in common to each other.

10. The device according to claim 7, wherein said first means comprise an operational amplifier having inverting and non-inverting input terminals respectively connected to the output terminals of said transistors, said operational amplifier being suitable for driving said transistors to provide a constant current to said battery.

11. The device according to claim 7 wherein said drive circuit comprises further means for regulating a voltage of said battery when the voltage of said battery has reached a reference voltage.

12. The device according to claim 11 wherein said further means turn off said first means when the voltage of the battery has reached said reference voltage.

13. The device according to claim 7 wherein the second means are connected to the output terminal of said second transistor, for setting a current that flows through said second transistor.

14. The device according to claim 13, wherein said second means comprise a current generator; means, sensitive to a temperature of the device, for producing a voltage in function of the temperature of the device; and means for comparing the voltage produced by said sensitive means with a reference voltage and varying the current on said second transistor in function of said comparison.

15. A device suitable for charging a battery, comprising:
an output terminal for connection to the battery;
first and second transistors coupled to an input voltage and having outputs, the output of said first transistor being coupled to the output terminal; and
a drive circuit structured to drive said transistors, said drive circuit including:
a first amplifier having first and second inputs and an output, the first and second inputs being coupled respectively to the outputs of the first and second transistors;
a second amplifier having an output and having first and second inputs coupled respectively to the output of the first transistor and a first reference voltage; and
an adder having first and second inputs coupled respectively to the outputs of the first and second amplifiers and having an output coupled to respective control terminals of the first and second transistors.

16. The device according to claim 15, wherein said first amplifier is an operational amplifier having inverting and non-inverting input terminals respectively connected to the outputs of said transistors, said operational amplifier being suitable for driving said transistors to provide a constant current to said battery.

17. The device according to claim 15 wherein said second amplifier is structured to turn off said first amplifier when an output voltage at the output terminal has reached said reference voltage.

18. The device according to claim 15 wherein said drive circuit comprises a current generator connected to the output of said second transistor, the current generator being structured to set a current that flows through said second transistor.

19. The device according to claim 18, wherein said current generator comprise means for varying the current on said second transistor in function of the temperature of the device.

20. The device according to claim 18, further comprising:
a temperature sensor structured to produce a voltage as a function of a temperature of the device; and
a comparator structured to compare the voltage produced by the temperature sensor with a second reference voltage and vary the current through the second transistor as a function of the companson.

21. A method, comprising:
charging a battery by driving first and second transistors having output terminals, the output terminal of the first transistor being connected to the battery, the charging including:
regulating a current in the battery during a charging phase of the battery;
varying a current through the second transistor as a function of a temperature of the device; and
keeping respective voltages on the output terminals of said transistors equal to each other during the charging phase of the battery.

22. The method according to claim 21, wherein driving the transistors includes providing a constant current to the battery.

23. The method according to claim 21, farther comprising regulating a voltage of the battery when the voltage of the battery has reached a reference voltage.

24. The method according to claim 23 wherein regulating the current in the battery is performed by a regulator circuit, and regulating a voltage of the battery when the voltage of the battery has reached the reference voltage includes turning off the regulator circuit when the voltage of the battery has reached the reference voltage.

25. A device suitable for charging a battery, comprising:
first and second transistors connected to an input voltage and having output terminals, the output terminal of said first transistor being structured to be connected to said battery, the first and second transistors each having a respective input terminal, the input terminals of the first and second transistors being directly connected in common to each other; and
a drive circuit structured to drive said transistors, said drive circuit comprising first means for regulating a current in said battery during a charging phase of said battery, said first means keeping respective voltages on the output terminals of said transistors equal to each other during the charging phase of said battery.

26. The device according to claim 25, wherein said first means comprise an operational amplifier having inverting and non-inverting input terminals respectively connected to the output terminals of said transistors, said operational amplifier being suitable for driving said transistors to provide a constant current to said battery.

27. The device according to claim 25, wherein said drive circuit further comprises second means for varying a current that flows through said second transistor as a function of a temperature of the device.

28. A device suitable for charging a battery, comprising:
first and second transistors connected to an input voltage and having output terminals, the output terminal of said first transistor being structured to be connected to said battery, the first and second transistors each having a respective control terminal, the control terminals of the first and second transistors being directly connected in common to each other; and
a drive circuit structured to drive said transistors, said drive circuit comprising first means for regulating a current in said battery during a charging phase of said battery, said first means keeping respective voltages on the output terminals of said transistors equal to each other during the charging phase of said battery.

29. The device according to claim 28, wherein said drive circuit comprises further means for regulating a voltage of said battery when the voltage of said battery has reached a reference voltage.

30. The device according to claim 28, wherein said drive circuit comprises further means for varying a current that flows through said second transistor as a function of a temperature of the device.

* * * * *

UNITED STATES PATENT AND TRADEMARK OFFICE
CERTIFICATE OF CORRECTION

| | | |
|---|---|---|
| PATENT NO. | : 7,498,771 B2 | Page 1 of 1 |
| APPLICATION NO. | : 11/741456 | |
| DATED | : March 3, 2009 | |
| INVENTOR(S) | : Angelo D'Arrigo et al. | |

It is certified that error appears in the above-identified patent and that said Letters Patent is hereby corrected as shown below:

Column 6, Line 10
"transistor in function of the temperature of the device" should read as --transistor in function of a temperature of the device--.

Column 6, Line 12
"means comprise a current generator; means, sensitive to a" should read as --means comprise a current generator; means, sensitive to the--.

Column 6, Line 60
"The device according to claim 13, wherein said second" should read as --The device according to claim 7, wherein said second--.

Column 6, Line 62
"means comprise a current generator; means, sensitive to a" should read as --means comprise a current generator; means, sensitive to the--.

Column 7, Line 35
"second transistor in function of the temperature of the device" should read as --second transistor in function of a temperature of the device--.

Column 7, Line 38
"function of a temperature of the device" should read as --function of the temperature of the device--.

Column 7, Line 51
"tion of a temperature of the device; and" should read as --tion of a temperature of a device; and--.

Signed and Sealed this
First Day of February, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,498,771 B2 | Page 1 of 1 |
| APPLICATION NO. | : 11/741456 | |
| DATED | : March 3, 2009 | |
| INVENTOR(S) | : Angelo D'Arrigo et al. | |

It is certified that error appears in the above-identified patent and that said Letters Patent is hereby corrected as shown below:

Column 6, Line 32
"further comprising second means for varying the current" should read as --further comprising second means for varying a current--.

Signed and Sealed this
Twenty-sixth Day of April, 2011

David J. Kappos
*Director of the United States Patent and Trademark Office*